March 12, 1946. H. E. SOMES 2,396,612
APPARATUS FOR HEAT TREATING
Filed Oct. 18, 1941 7 Sheets-Sheet 1
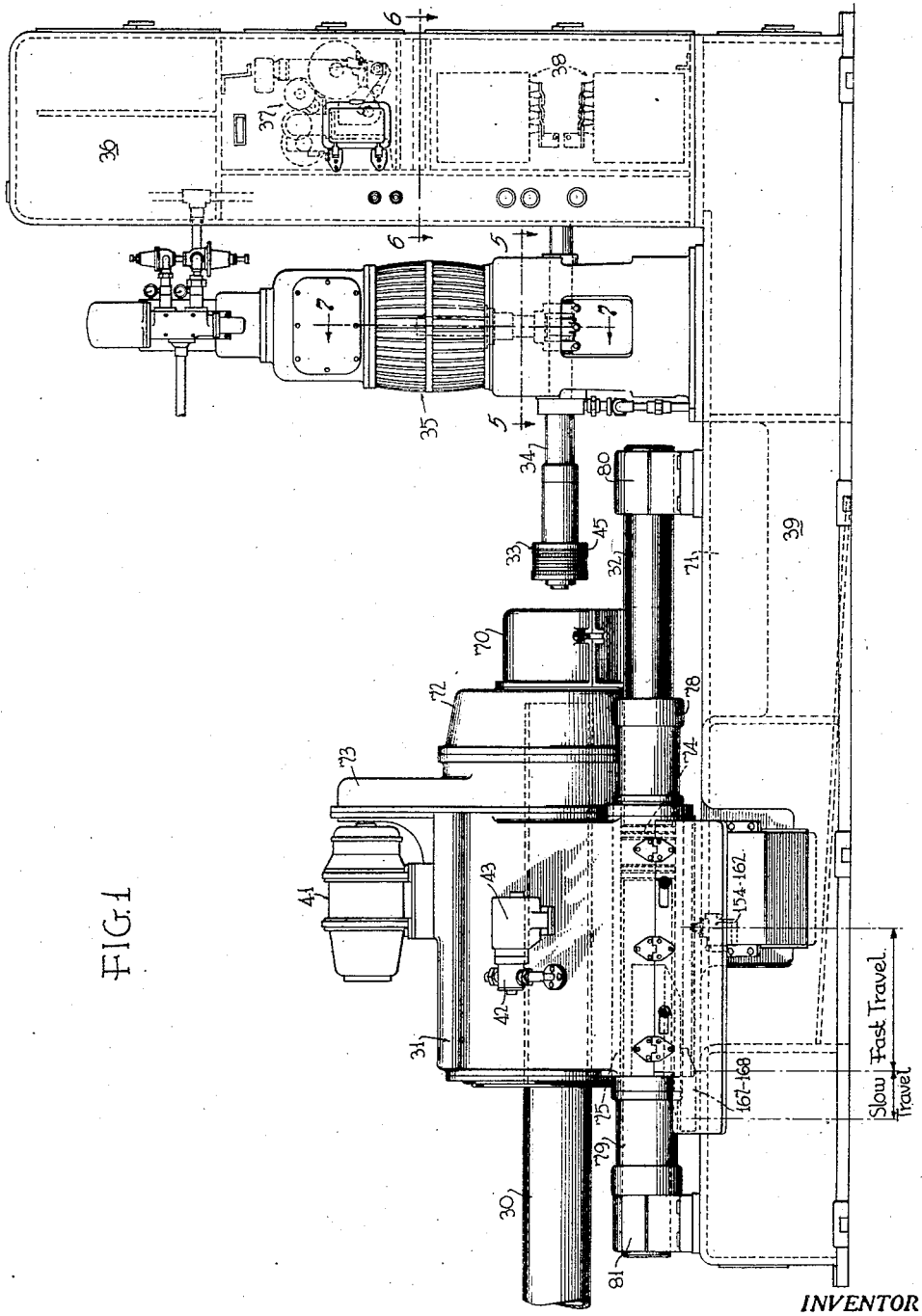
INVENTOR
Howard E. Somes
BY
ATTORNEY

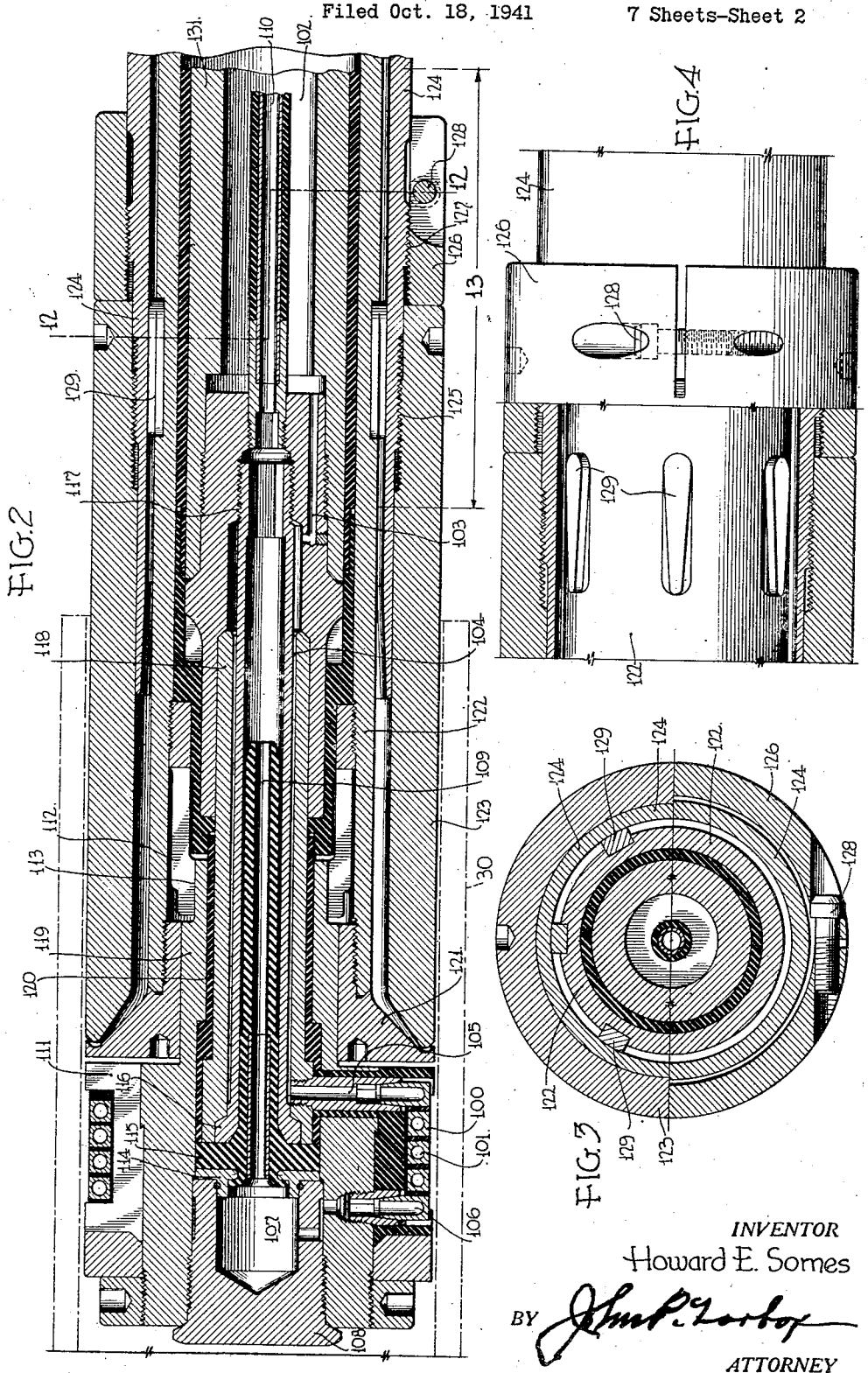

March 12, 1946. H. E. SOMES 2,396,612
APPARATUS FOR HEAT TREATING
Filed Oct. 18, 1941  7 Sheets-Sheet 3

INVENTOR
Howard E. Somes.
BY
ATTORNEY

March 12, 1946.  H. E. SOMES  2,396,612
APPARATUS FOR HEAT TREATING
Filed Oct. 18, 1941  7 Sheets-Sheet 5

INVENTOR
Howard E. Somes
BY *[signature]*
ATTORNEY

INVENTOR
Howard E. Somes

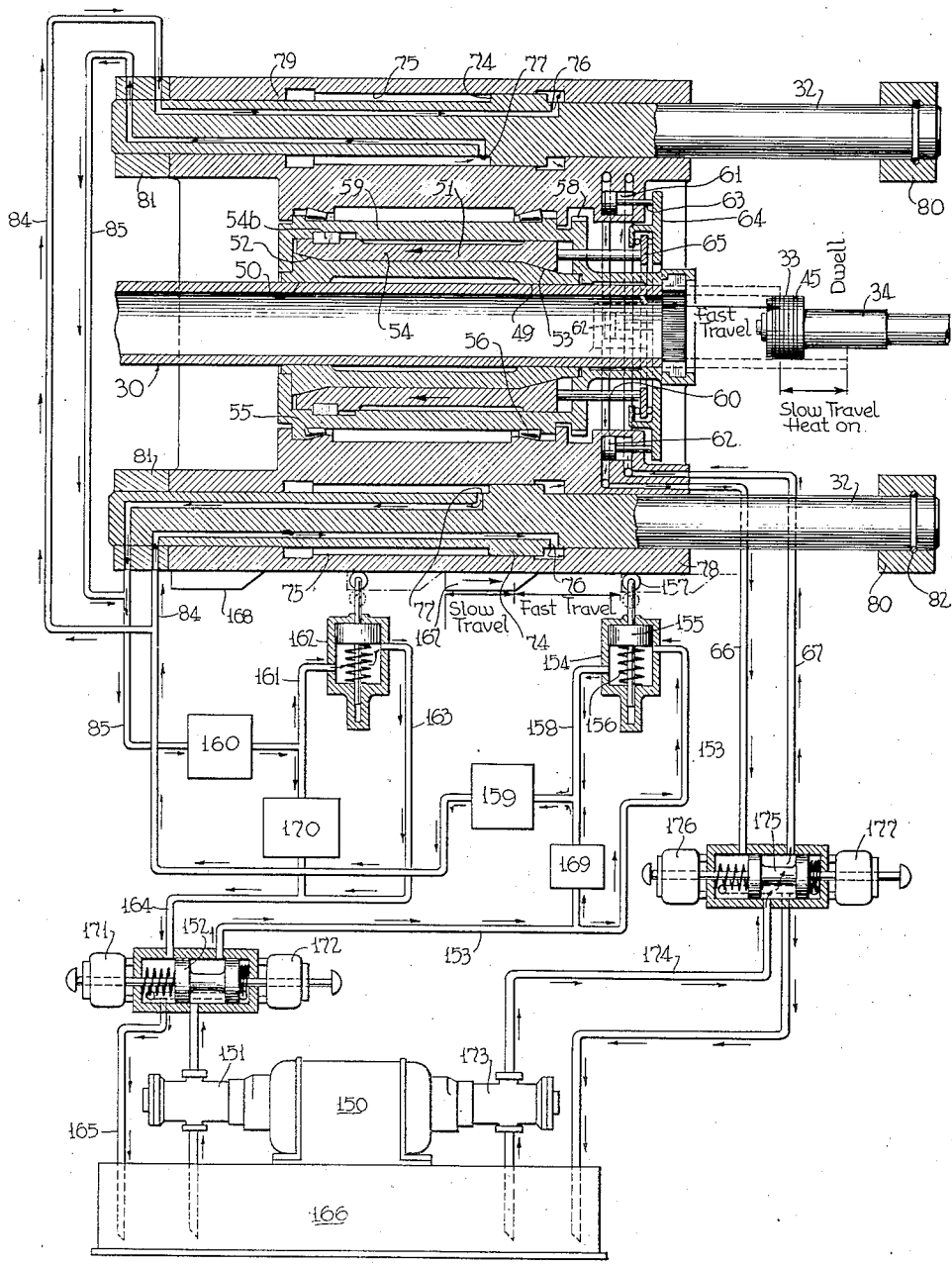

Patented Mar. 12, 1946

2,396,612

UNITED STATES PATENT OFFICE 2,396,612

APPARATUS FOR HEAT-TREATING

Howard E. Somes, Detroit, Mich., assignor to Budd Induction Heating, Inc., Philadelphia, Pa., a corporation of Michigan Application October 18, 1941, Serial No. 415,580

3 Claims. (Cl. 266—4)

This invention relates to heat treating apparatus of the type wherein a hardenable metallic article is heated to hardening temperature by electro-magnetically induced heating currents and then quenched. The invention is directed in particular to a heating and quenching head for progressively heating and quenching the bores of tubular articles.

One of the objects of the present invention is to provide an induction heating head having a supporting arbor with a surrounding sleeve in which the arbor and sleeve are spaced apart for the passage of quenching fluid therebetween and are so arranged as to provide for the peripheral discharge of quenching fluid immediately adjacent the inductor or heating coil of the heating head.

Another object is to provide a pair of concentric tubular conductors in current conducting relation with a hollow heating inductor together with an annular member surrounding the outdoor conductor in which the conductors and annular member are so arranged as to provide for the flow of cooling fluid to the conductor through the inner conductor and for the flow of quenching fluid between the outer conductor and the annular member for peripheral discharge immediately adjacent the inductor.

A further object is to provide a plurality of streamline elements in the space between the outer conductor and the surrounding annular member for minimizing turbulence of the quenching fluid flowing in such space to the discharge opening.

Referring to the drawings:

Fig. 1 is a side view of the apparatus, apart from the control valves and the like which are not shown;

Fig. 2 is a longitudinal section through the inducing head and its supporting arbor;

Fig. 3 is a section on the line 3—3 of Fig. 2;

Fig. 4 is a right-side view partly in section of the axial length designated 4 in Fig. 2;

Fig. 9 is a diagrammatic view of the hydraulic circuits for translating the work holder and for clamping and unclamping it;

Figure 5:
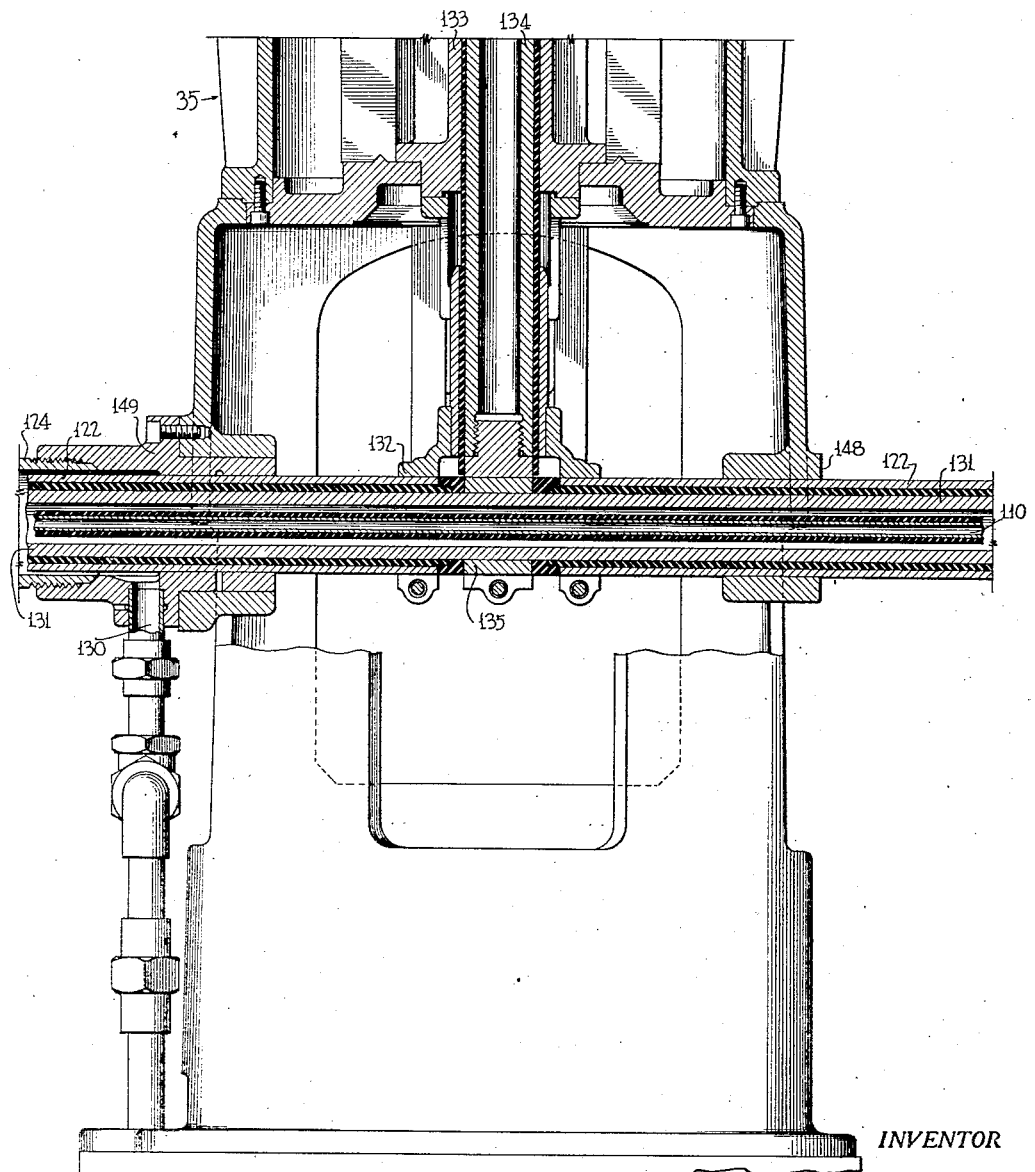
Fig. 5 is a longitudinal section showing the transformer connections to the supporting arbor.

Although the present invention as defined by the claims is directed solely to the relationship of the induction head, the conducting arbor and the arbor surrounding sleeve which forms one wall of the quenching fluid passage, the following description in addition to setting forth the details of the conductor of these parts also, for the purpose of illustration and affording a clear understanding of the operation of these parts, sets forth one form of heat treating apparatus to which these parts are applicable and the operation of the same.

A workpiece such as a long section of pipe 30 of the type used in oil wells and lines is adapted to be gripped by a work holder within the enclosure 31 so that the inner surface of an end portion of the work may be heated by electromagnetic induction and hardened by prompt quenching with water or other appropriate cooling fluid. The work holder in the embodiment illustrated is slidable on the spaced guides 32 for cooperation with an inducing head 33 which is shown as fixed on the supporting arbor 34, the head being supplied with high-frequency alternating current from the transformer within the casing 35. This transformer is similar in construction and operation to that shown and described in my prior application Serial No. 392,867, for "Heat treating apparatus" filed May 10, 1941. Within the upper portion 36 of the housing to the right of the transformer housing in Fig. 1 are located a plurality of relays (not shown) which are responsive to a timing and sequence controller 37 located below them. Below the sequence controller are a number of capacitors 38 for the usual purposes such as improving the power factor of the inductive load. The two small circles shown to the left of the sequence controller are indicating lights for the operator. The three knobs or buttons shown to the left of the capacitors in Fig. 1 are for manually starting and stopping the repeating cycles of operation, the lower one being for starting the automatic time controlled cycle of operations while the top one is for stopping. The intermediate knob is a manual control whereby the heat may be manually turned off the inducing head. The entire apparatus shown in Fig. 1 is illustrated as being mounted on a cast iron bed or frame. On top of the enclosure 31 is an electric motor 41 for rotating the work holder and work during the heating and quenching operations to assist in obtaining uniformity in heating and hardening. An oil pump 42 located on the side of the enclosure 31 is driven by a suitable motor 43 for lubricating various parts of the work holder.

The work holders shown in diagrammatic form in Fig. 9, is shown and described in my copending divisional application, Serial No. 453,781, filed August 6, 1942. Briefly, the work holder includes a collet-type chuck sleeve 51 having portions 49 and 50 for gripping the tubular workpiece 30 and axially spaced cam portions 52 and 53 which cooperate with corresponding cam portions on a surrounding axially slidable annular member 54. The member 54 is keyed by key 54b to a surrounding rotatable guide cylinder 59 for slidable movement relative thereto, the cylinder 59 being supported on anti-friction bearings 55 and 56 for rotation relative to the housing 31. The cylinder is driven through gear 58 and intermediate gearing (not shown) from the motor 41. For axially shifting the member 54 to actuate the gripping portions 49 and 50 of the collet sleeve into clamping engagement with the tubular workpiece 30, a plurality of rods 60 connected therewith are employed for deriving actuating force from a plurality of fluid pressure cylinders 61 and pistons 62 whose piston rods 63 are connected to a non-rotatable thrust ring 64, this ring being connected through anti-friction bearings to the thrust ring 65 to which the rods 60 are connected. Fluid pressure conduits 66 and 67, connected to the cylinders 61, are connected to a control valve 175 which is responsive in its action to the timing and sequence controller. Since the quenching nozzle 45 is located on the right of the inducing conductors 33 the work is caused to travel toward the right, the right end portion of the work being heated first. This relative translation between the inducing head and work takes place by movement of the entire work holder upon the guides 32 while the inducing head remains stationary. In addition to this translation of the work for sequentially heating, the work and its holder are rotated to obtain greater uniformity in heating and hardening. After being heated the water or other quenching fluid is forced out of the quenching nozzle 45 so as to be directed away from the inducing head and under pressure sufficient to push the quenching liquid out from the space between the supporting arbor and the work into the protecting hood 70 from which it falls into the sump 71. From the sump the quenching liquid may be filtered, cooled and used again. For work of different diameters than that illustrated, the inducing head as well as the quenching nozzle are removable in order that a head and nozzle of the right size may be substituted. The casing portion 72 surrounds the thrust bearing between the hood 70 and another casing portion 73 encloses the driving gears.

Pistons 74 are fixed to the guides 32 for causing sliding movement of the cylinders 75 and the casing 31 supported thereby. The guides 32 are supported on the main bore 39 by brackets 80 and 81 and the cylinders 75 are provided with packing sleeves 78 and 79. For movement of the cylinders 75 to the left as viewed in Figure 9, fluid under pressure enters the cylinders through ports 76 and for movement to the right through ports 77. The actuating fluid is supplied through conduits 84 and 85 and passages within the guides 32, which conduits are connected to control valves to be later described which are under the control of the sequence controller.

Fig. 2 shows inducing conductor 100 in the form of a number of convolutions, such conductor being provided with an internal cooling passage 101. Water or other appropriate coolant is supplied through the passage 102, thence through the passages 103 and 104 to the radial passage 105, through the several turns of the inducing conductor and thence out through the radial passage 106, the recess 107 in the nut 108, and the inside insulated passages 109 and 110. Due to the water discharge from the inducing conductor being substantially heated, it has been found desirable to thermally insulate the discharge passage for such water. Radial laminations 111 surround the inducing conductor for purposes well known in this art, such laminations being supported by the main body of the head, having an extension 119 which contacts with the yieldable fingers 112 on surface 113 for carrying current from the outer or grounded side of the inducing conductor to the arbor portion 122. The opposite end of the inducing conductor is shown as being connected to the insulated arbor portion 131.

In order to substitute a head and quenching nozzle of different diameter where different size work is being hardened, it is necessary to replace the present head and nozzle with one of different diameter. In the present invention the inducing head is removable in comparatively simple manner, only two threaded connections need to be removed in order to take off the head. For this purpose the nut 108 is unscrewed and this causes the ring 114 which is keyed thereto to likewise come off, pulling with it the insulation 115 together with the insulating portion which forms the passage 109. It is next necessary to loosen the elongated bolt 116 by a wrench applied to its head, unscrewing the threads 117 and enabling the sleeve 118 which is clamped by the elongated bolt 116 to be removable. This sleeve as shown in Fig. 2 has a beveled inner end portion, and upon its removal the body portion of the inducing head, together with the extension 119, may be withdrawn outwardly together with the insulation 120. To remove the quenching nozzle it is first necessary to take off the nut 121 which constitutes one wall of the quenching nozzle passage and its supply passage, this being connected with the arbor portion 122 by the threads illustrated on the inside of this arbor portion and on the outside of the reduced part of the nut. The sleeve 123 constitutes the opposite wall of the quenching nozzle and its supply passage and after removal of the nut may be removed by unscrewing it from the arbor portion 124 by means of the threads 125. A sleeve 123 of different diameter and a nut 121 of different radial depth may be substituted for those removed where work of different diameter is to be treated. To aid in holding the sleeve 123 securely in place, a partially split lock nut 126 is adapted to abut the sleeve 123, the nut 126 engaging the arbor portion 124 by the threads 127. A bolt 128 may be unloosened to facilitate removal or shifting of the nut 126. Quenching liquid passes through the arbor in the passage between the portions 122 and 124. In order to assist in supporting the end of portion 124, a plurality of short supporting columns 129 are located in the quenching liquid passage. These columns are shown in Fig. 4 as being of streamline cross-section, so that the liquid may have little or no turbulence before being discharged from the quenching nozzle 45. Due to the comparatively small clearance between the supporting arbor and the work in Fig. 2, it will be seen that substantial quenching liquid pressure is desirable to assist in forcing the liquid out of the work. The supply of quenching liquid is controlled by a valve which in turn is controlled from the timer and sequence mechanism. Immediately upon cutting off the supply of quenching liquid, compressed air is supplied through the quenching liquid passage to the nozzle in order that the compressed air may blow all quenching liquid particles off the work with the result that no one peripheral portion of the work should be cooled unevenly with respect to another by longer contact with the quenching liquid. The compressed air thus serves to dry the work and to further cool the work according to the temperature of the air used. The drying of the work by the compressed air may be due to the rapid evaporation from the air current alone or assisted by residual heat in the work, or both. The temperature of the air blown over the work after cutting off the quenching liquid may be as cool as is desired, even to the extent of having air refrigerated to sub-normal temperatures. On the other hand, if no further cooling or chilling of the work is desired, it is possible that air might be heated where slow cooling of the work is desired.

Figure 6:
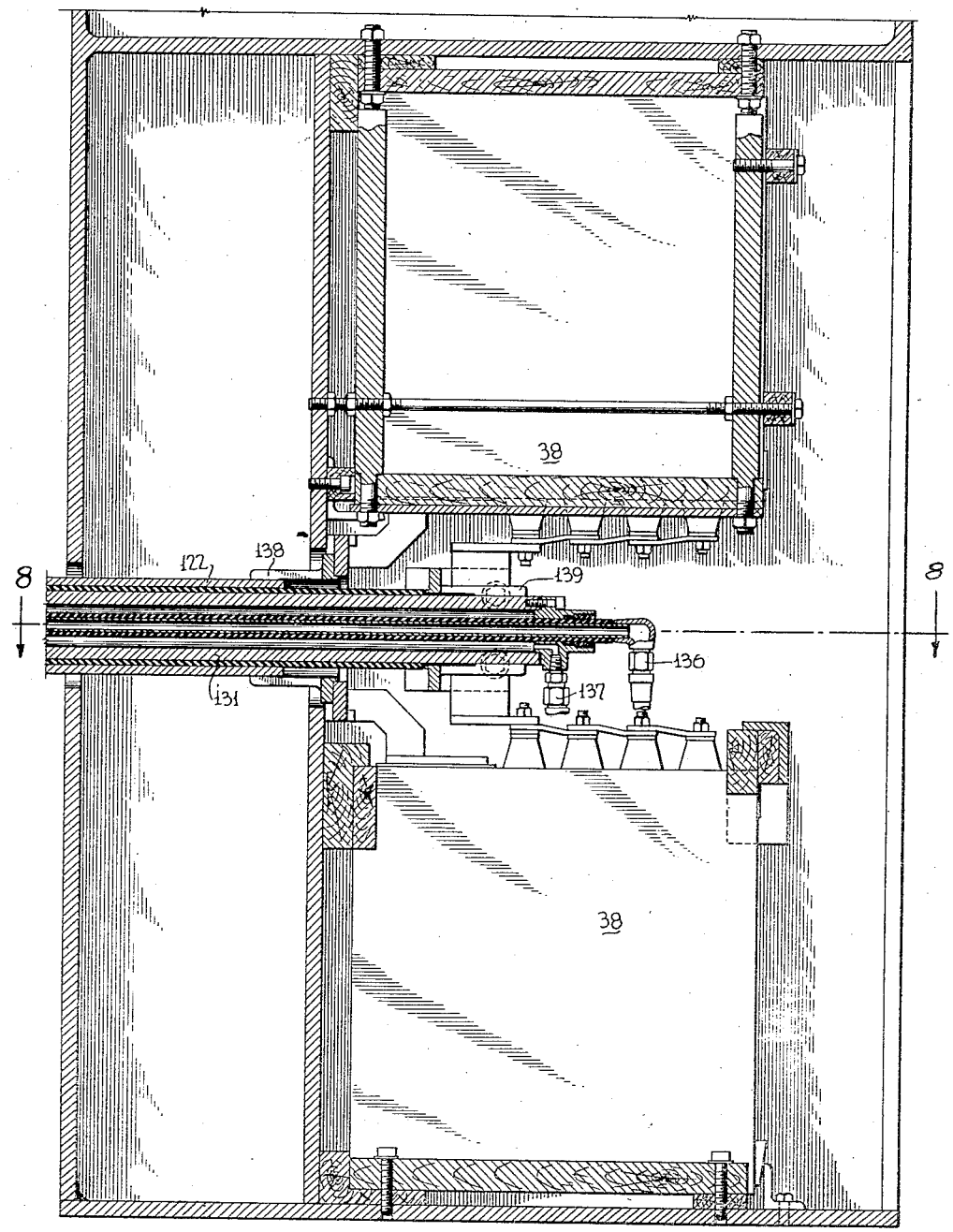
Fig. 6 is a section on the line 6—6 of Fig. 1.
Figure 7:
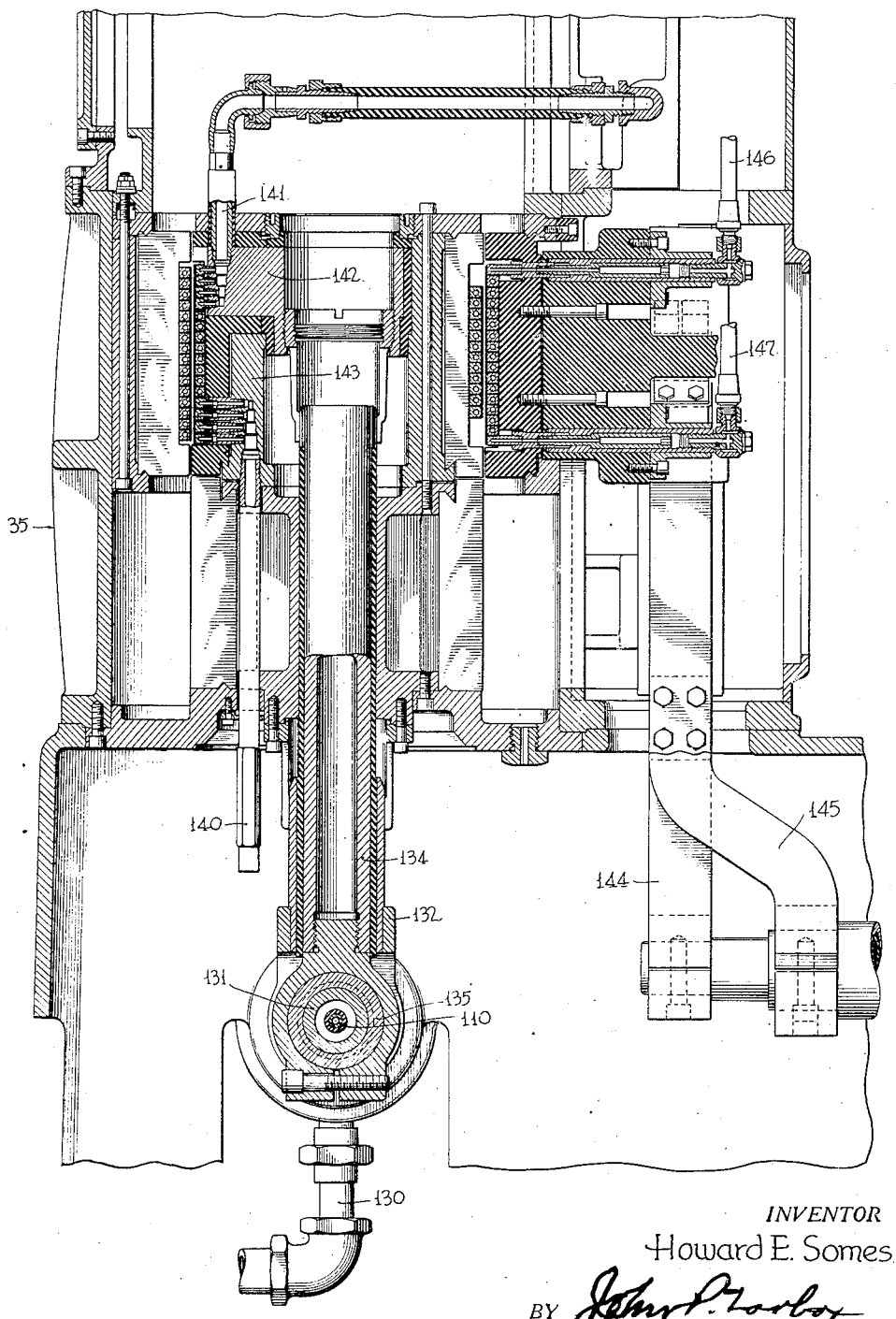
Fig. 7 is a section on the line 7—7 of Fig. 1.
Figure 8:
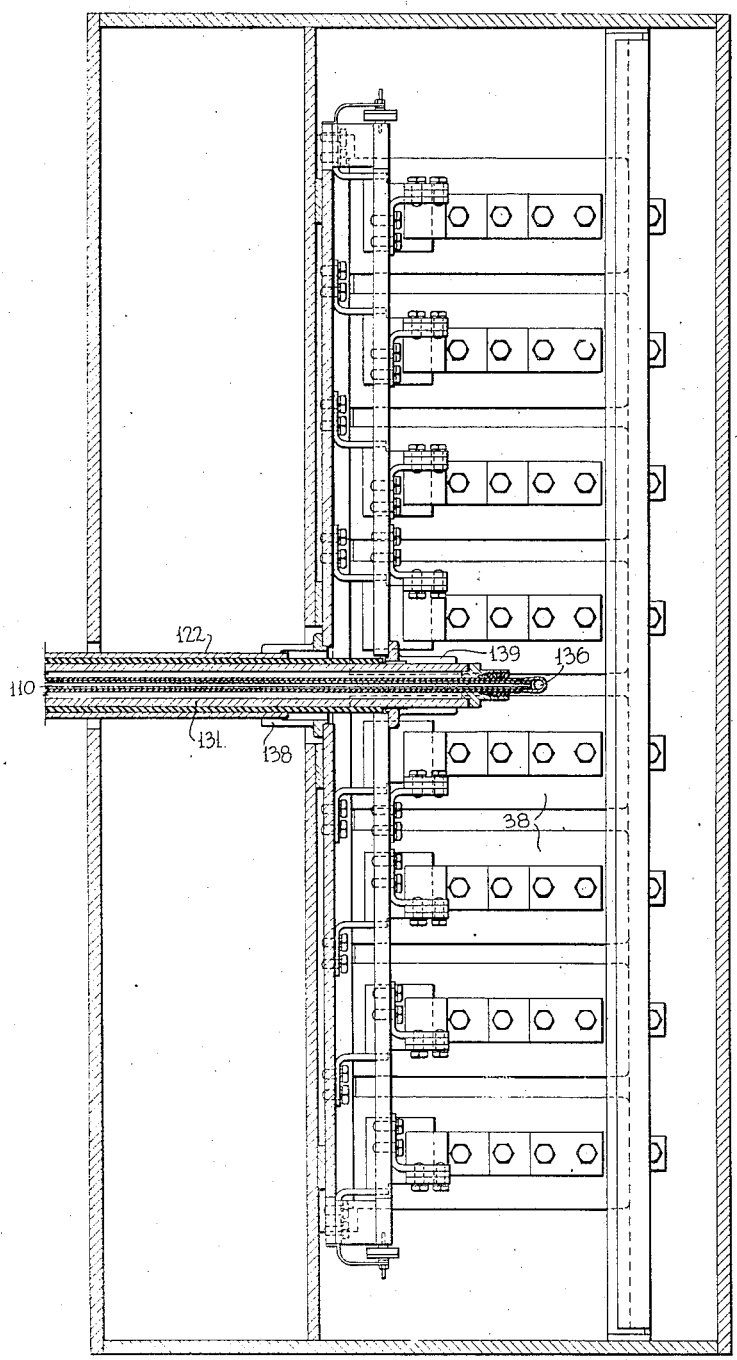
Fig. 8 is a section on the line 8—8 of Fig. 6.

The supply pipe 130 contains quenching liquid and then after the liquid cut-off, supplies the compressed air or other gas to the quenching nozzle. The insulated or ungrounded portion of the supporting arbor 131 is connected to a clamp 135 as shown in both Figs. 5 and 7, while the grounded arbor portion 122 is connected to the clamp 132 leading to the transformer conductor 133. The conductors 131 and 135 are connected as shown in Fig. 5 to the inner transformer terminal 134. From the transformer connections the arbor portions pass through the supports 148 and 149. As shown in Figs. 5 and 6, the conductors from the transformer extend into the adjacent enclosure for connection to capacitors 38 shown also in Fig. 1. The cooling liquid for the inducing coil enters at the connection 137 and is discharged at the connection 136 (Fig. 6). The contacts 138 and 139 lead to the capacitors 38. The cooling fluid for the secondary conductors of the transformer enters by the passage 140 and is discharged through the passage 141 shown in Fig. 7. The secondary terminal blocks 142 and 143 are connected to the transformer secondary terminals 132 and 134. The primary leads 144 and 145 are also provided with cooling fluid passages in the windings of the primary, such passages being connected to the inlet and outlet pipes 146 and 147. As is the situation in the aforementioned application referred to previously and in others, the primary winding of this transformer is vertically shiftable for the usual and well-known purposes.

An electric motor 150 drives an oil pump 151 for supplying oil through the four-way open-center valve 152 and the pipe line 153, through the shut-off valve 154. A piston valve 155 is normally held open by the spring 156 allowing free passage of the oil through it, a roller 157 bearing against the work. With the shut-off valve 154 open as illustrated, oil then flows through the pipe 158 and the counterbalance valve 159 and pipes 84 through the cylinder ports 76 to the cylinders 75 for moving the cylinders 75 on the guides 32. While the oil is flowing into the cylinders through the pipes 84, such liquid is being ejected from the cylinders on the opposite sides of the pistons 74, through the pipes 85, through the counter-balance valve 160, pipe 161, shut-off valve 162, pipes 163 and 164, valve 152 and pipe 165 into the oil tank 166. Fixed with respect to the cylinders 75 are the cam blocks 167 and 168 which are adapted to be engaged by the rollers of the shut-off valves 154 and 162 and close such valves. When the shut-off valve 154 is closed, oil or other fluid being used passes through the reduced flow valve 169, thence through the counter-balance valve 159 into the cylinders 75 by way of the supply pipes 84. During the time that oil is flowing into one end of the cylinders 75 it is flowing out of the other end. Both shut-off valves 154 and 162 are simultaneously actuated by the cam blocks 167 and 168.

When the work and its clamping means reaches the end of its travel, the timing and sequence controller actuates solenoid 171 to shift the valve 152 for causing oil to flow from the pump 151 through the pipes 164, 163, shut-off valve 162, counter-balance valve 160, pipes 85, into the opposite end of the cylinders 75. The flow of oil through the reduced flow valves 169 and 170 results in the movement of the work holder carriage along the guides 32, being much slower than is the movement when the cam blocks 167 and 168 are not engaged by the rollers of the shut-off valves. As the work is moved from left to right, in the portion of travel marked on the drawing of Fig. 9 as "slow travel," the sequence controller actuates the current controls for supplying inducing current to the head 33. When the work is heated to the desired axial length, adjustable stops cause the fluid pressure to be cut off from the translating cylinders 75, stopping the relative movement between the work and the inducing and quenching heads. The work is next caused to reverse its direction and move from right to left.

Where the work is of the character such that further heat treatment may be desirable, but without hardening, the inducing coil may be again energized by the sequence controller. Preferably the travel from right to left as shown in Fig. 9 is more rapid than the slow travel of the work during the hardening period. For this purpose it has been found that travel of the work at about double its speed during the hardening period will be sufficient to enable the same frequency and current conditions in the inducing head to heat the work as much as is desired, but to below a hardening temperature. After the shut-off valve rollers are moved from the cam blocks 167, 168, travel of the work to and from the heating period is much more rapid. To return the work after the hardening operation oil is conducted through the pipes 164 from the pump 151, but since the shut-off valve 162 is closed the oil is forced through the reduced flow valve 170, counter-balance valve 160, pipe 85, into the cylinders 75. During this slow-motion heating period there is a larger flow opening in the valve 170 than in the valve 169 so that more rapid travel of the work is experienced as the oil passes through the reduced flow valve 170 and the counter-balance valve 160. This reduced flow keeps up until the shut-off valve rollers ride off the cam blocks 167 and 168 when the speed of the carriage increases. During the time that oil passes through the reduced flow valves 169 and 170, the speed of the motor and oil pump is not substantially changed, but a by-pass valve at the pump 151 prevents excessive oil pressures from being built up by reason of the reduced flow. Solenoids 171 and 172 actuate the four-way open-center valve 152 against the springs shown in each end of this valve casing. As shown in the drawing the solenoid 172 has actuated the valve 152 to move it into the position illustrated. When the solenoid 171 is energized and solenoid 172 deenergized, the valve is shifted to send oil through the counter-balance valve 160 and pipes 85 into the cylinders, while oil from the opposite ends of the cylinders 75 exhausts through the pipes 84, counter-balance valve 159, and reduced flow valve 169, while the shut-off valve 154 is closed. The same amount of oil is moving into the cylinders through valves 170 and 160. Since the opening in the reduced flow valve 169 is smaller than that in the valve 170, it will be necessary for the oil being returned to the tank 166 to flow through the valve 169 at a greater rate than could be accommodated by the reduced flow opening alone, and for this reason a check valve, not shown, is embodied in and may form a part of the reduced flow valve 169 so as to allow a larger flow through the valve 169 to occur toward the tank 166 than occurs when oil is moved away from it or upwardly in the drawing.

The pump 173 supplies oil pressure through the pipe 174 and four-way open-center valve 175, pipes 67 into the cylinders 61 for shifting the cam ring to the left as shown in Figure 9 for closing the work gripping portions upon the work. Oil supplied through the pipe 67 is controlled by the solenoid 177, whereas oil supplied through the pipe 66 is controlled by the energization of solenoid 176. These cylinders 61 and their actuating solenoids are also controlled from the timing and sequence controller. When either the pump 151 or 173 builds up more pressure than is desired, the oil is by-passed around the pump through a suitable check valve, not shown.

All operations except the insertion and removal of the work are normally automatic in response to operation of the timing and sequence controller. The one end of the work, frequently in the form of considerable length of pipe, is moved into the work holder. The chuck or collet then grips the work tightly, after which the motor for rotating the work may be started or this motor may be continuously operated. After the work is securely held, it is moved toward the heating head at a speed of about 12 inches per second until the cams on the cylinders 75 are encountered for slowing the movement of the work to about one inch per second throughout the length of the portion to be hardened. As the end of the work comes adjacent the inducing head, the high frequency circuit through the inducing head is closed. During the heating operation travel of the work is from left to right in the drawings. When the quenching nozzle comes adjacent the heated portion of the work, quenching fluid is ejected under pressure, the pressure of the fluid causing the water to move away from the heating coil. When the desired length of work has been heated, the current through the inducing coil is stopped while the quench continues until the full length of work that is heated has been quenched and hardened. Immediately upon cessation of the quenching liquid, compressed air is ejected from the quenching nozzle to blow any residual liquid out of the work. After the full length of the work to be hardened has been so treated, relative travel between the work and inducing head ceases and translation of the work in the opposite direction begins. Substantially simultaneously with initiation of the movement of the work away from the inducing head, the inducing current is again turned on. In order that the reheating may be to a temperature below that needed for further hardening, the withdrawal travel of the work is preferably at a speed of about 2 inches a second, or approximately double that of the speed when heating the work to a hardening temperature. This rate of withdrawal contemplates the inducing current and frequency being about the same as was used for hardening, but with the greater speed the same energy input is spread over a greater area. This reheating may or may not be used. After the work has been moved from the inducing head its original rapid travel of about 12 inches a second is resumed to the end of the stroke when the gripping portions release the work, enabling it to be withdrawn from the collet and a new workpiece inserted. The timing mechanism is usually adjusted to give the operator ample time to withdraw and replace a workpiece when the cycle of operation is automatically repeated.

Among the advantages of this invention may be mentioned the tight clamping of the work at a location axially separated from the heated portion. With ordinary size oil pipe a clamping pressure in the neighborhood of 20,000 pounds is used, and this pressure is so high that if it were applied in the same transverse portion of work which is heated, there might be danger of fracture or distortion. A noteworthy feature of this invention is the simplicity of construction whereby the quenching head is easily removable after the inducing head has been removed. The inducing head is removable on removing no more than two threaded members. The inducing and quenching heads are removable so that a larger or smaller head may be placed on the same arbor for cooperation with a workpiece of the size for which the inducing and quenching heads are adapted. The more rapid withdrawal of the work from the inducing head is at a rate such that the work is heated, but yet heated below a hardening temperature, after the work has already been hardened, this additional heating being to toughen the hardened portion. Another feature of this invention is the use of compressed air or other gas supplied to the quenching fluid passage for blowing any quenching liquid out of the work. Otherwise, when the work is reheated during its withdrawal, the reheating might be non-uniform if water was encountered over parts of the work. The provision of thermal insulation around the coil cooling liquid discharge passage prevents the arbor and the cooling liquid supplied from becoming heated as much as has previously been the case, whereby the coil cooling is rendered more efficient.

Unless otherwise specified herein, the operation as well as the construction of the timing and sequence controller and other parts may be of the type described and shown in the aforementioned companion application Serial No. 392,867, for "Heat treating apparatus" filed May 10, 1941.

The details of construction of the heating head per se, the connection between the arbor, the transformer and the capacitors, and the work supporting chuck are respectively set forth in divisional applications Serial No. 446,568, filed June 11, 1942, now Patent No. 2,359,272, Serial No. 453,780, filed August 6, 1942, now Patent No. 2,359,273 and Serial No. 453,781, filed August 6, 1942.

Though only a single form of the invention is illustrated and described, the invention is not limited thereto but may be embodied in various forms as desired. As various changes in construction and arrangement of parts may be made without departing from the spirit of the invention as will be apparent to those skilled in the art, reference will be had to the appended claims for a definition of the limits of the invention.

What is claimed is:

1. In a heat treating apparatus, an arbor including concentric inner and outer annular current conductors insulated from each other; an inductor having terminals connected with said conductors and a cooling passage connected with the bore of the inner conductor; a sleeve surrounding said outer conductor in circumferentially spaced relation and having one end terminating adjacent said head; an annular member connected with said outer conductor and having a circumferential flange extending between said inductor and said one end of said sleeve, said one end and said flange being contoured to define a peripheral quenching fluid discharge passage adjacent said head and in communication with the space between said sleeve and outer conductor; means for introducing quenching fluid into said space; and means for introducing cooling fluid into the bore of said inner conductor.

2. In a heat treating apparatus, a heating head having a hollow inductor element, a supporting arbor for said head, said arbor having an internal passage therein connected with the hollow of said inductor element for conducting cooling fluid thereto, means adjacent said inductor element and forming a radially outwardly extending continuation of the external surface of said arbor, and annular means surrounding said arbor in circumferentially spaced relation therewith and terminating at one end in axially spaced relation with said radially outwardly extending arbor continuation for conducting quenching fluid along said arbor in heat exchange relation therewith for discharge through the space between its said one end and said continuation.

3. In a heat treating apparatus having an arbor; annular means surrounding said arbor in circumferentially spaced relation therewith, means associated with said arbor and having a flange-like portion spaced axially from one end of said annular means to provide a peripheral quenching fluid discharge passage, means for introducing quenching fluid under pressure into the space between said arbor and said annular means for flow to said discharge passage, and a plurality of circumferentially spaced elements of streamline configuration disposed in said space in advance of said discharge passage whereby to minimize turbulence in the quenching fluid flowing to said passage.

HOWARD E. SOMES.